United States Patent
Sugibuchi

(10) Patent No.: US 9,779,347 B2
(45) Date of Patent: Oct. 3, 2017

(54) SMART CARD AND PORTABLE ELECTRONIC APPARATUS

(71) Applicant: KABUSHIKI KAISHA TOSHIBA, Minato-ku, Tokyo (JP)

(72) Inventor: Kei Sugibuchi, Kawasaki (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 17 days.

(21) Appl. No.: 13/799,770

(22) Filed: Mar. 13, 2013

(65) Prior Publication Data

US 2014/0054382 A1   Feb. 27, 2014

(30) Foreign Application Priority Data

Aug. 23, 2012 (JP) .................................. 2012-184531

(51) Int. Cl.
*G06K 19/073* (2006.01)
*G06Q 20/34* (2012.01)

(52) U.S. Cl.
CPC ......... *G06K 19/073* (2013.01); *G06Q 20/341* (2013.01); *G06Q 20/3576* (2013.01)

(58) Field of Classification Search
CPC ............... G06F 21/78; G06F 12/1466; H04N 1/00347; H04N 1/2112; H04N 1/2125; G06K 19/073; G06Q 20/341; G06Q 20/3576
USPC ........................................................ 235/492
See application file for complete search history.

(56) References Cited

U.S. PATENT DOCUMENTS

| | | | |
|---|---|---|---|
| 2003/0065866 A1* | 4/2003 | Spencer | G06F 3/0613 710/306 |
| 2003/0188126 A1* | 10/2003 | Sudo | 712/1 |
| 2006/0169786 A1* | 8/2006 | Chen | G06K 19/077 235/492 |
| 2007/0207798 A1 | 9/2007 | Talozi et al. | |
| 2009/0163176 A1 | 6/2009 | Hasegawa | |

(Continued)

FOREIGN PATENT DOCUMENTS

| EP | 1079340 A2 * | 2/2001 |
|---|---|---|
| EP | 1643465 A1 * | 4/2006 |

(Continued)

OTHER PUBLICATIONS

Extended European Search Report dated Jan. 17, 2014 in the corresponding EP application No. 13159147.1.

(Continued)

*Primary Examiner* — Sonji Johnson
(74) *Attorney, Agent, or Firm* — Posz Law Group, PLC

(57) ABSTRACT

According to one embodiment, a smart card includes a communication unit, recording unit, first reception processor, determination unit, and first transmission processor. The recording unit records data defined by definition information. The first reception processor receives a command from an external terminal. If the first reception processor receives the command, the determination unit determines whether or not data required for execution of the command is stored in the recording unit. If the determination unit determines that the required data is not stored in the recording unit, the first transmission processor transmits a response indicating the start of a session required to acquire data related to that data from the external terminal to the external terminal.

12 Claims, 7 Drawing Sheets

(56) References Cited

U.S. PATENT DOCUMENTS

| | | | |
|---|---|---|---|
| 2009/0240978 A1* | 9/2009 | Sudo | 714/6 |
| 2009/0313483 A1 | 12/2009 | Ranade | |
| 2010/0235629 A1* | 9/2010 | Tuda | 713/159 |
| 2015/0024730 A1 | 1/2015 | Wakasa et al. | |

FOREIGN PATENT DOCUMENTS

| | | |
|---|---|---|
| EP | 2 169 639 A1 | 3/2010 |
| EP | 2 228 734 A1 | 9/2010 |
| FR | 2 842 622 A1 | 1/2004 |
| JP | 2003-036424 A | 2/2003 |
| JP | 2007-066042 A | 3/2007 |
| JP | 2009-152812 A | 7/2009 |
| JP | 2009-528734 A | 8/2009 |
| WO | 00/26866 A1 | 5/2000 |
| WO | WO0026866 * | 11/2000 |
| WO | 02/10889 A2 | 2/2002 |

OTHER PUBLICATIONS

Office Communication dated May 24, 2016 in the corresponding EP application No. 13 159 147.1.

Office Action issued Feb. 2, 2016 in the corresponding JP application No. 2012-184531 (with English translation).

* cited by examiner

| File ID | Address | File size | Terminal-side file ID |
|---------|---------|-----------|------------------------|
| 0x0001  | 0x0123  | 0x0045    |                        |
| 0x0002  | 0xFFFF  | 0x0067    | 0x0102                 |
| 0x0003  | 0x0234  | 0x0089    |                        |

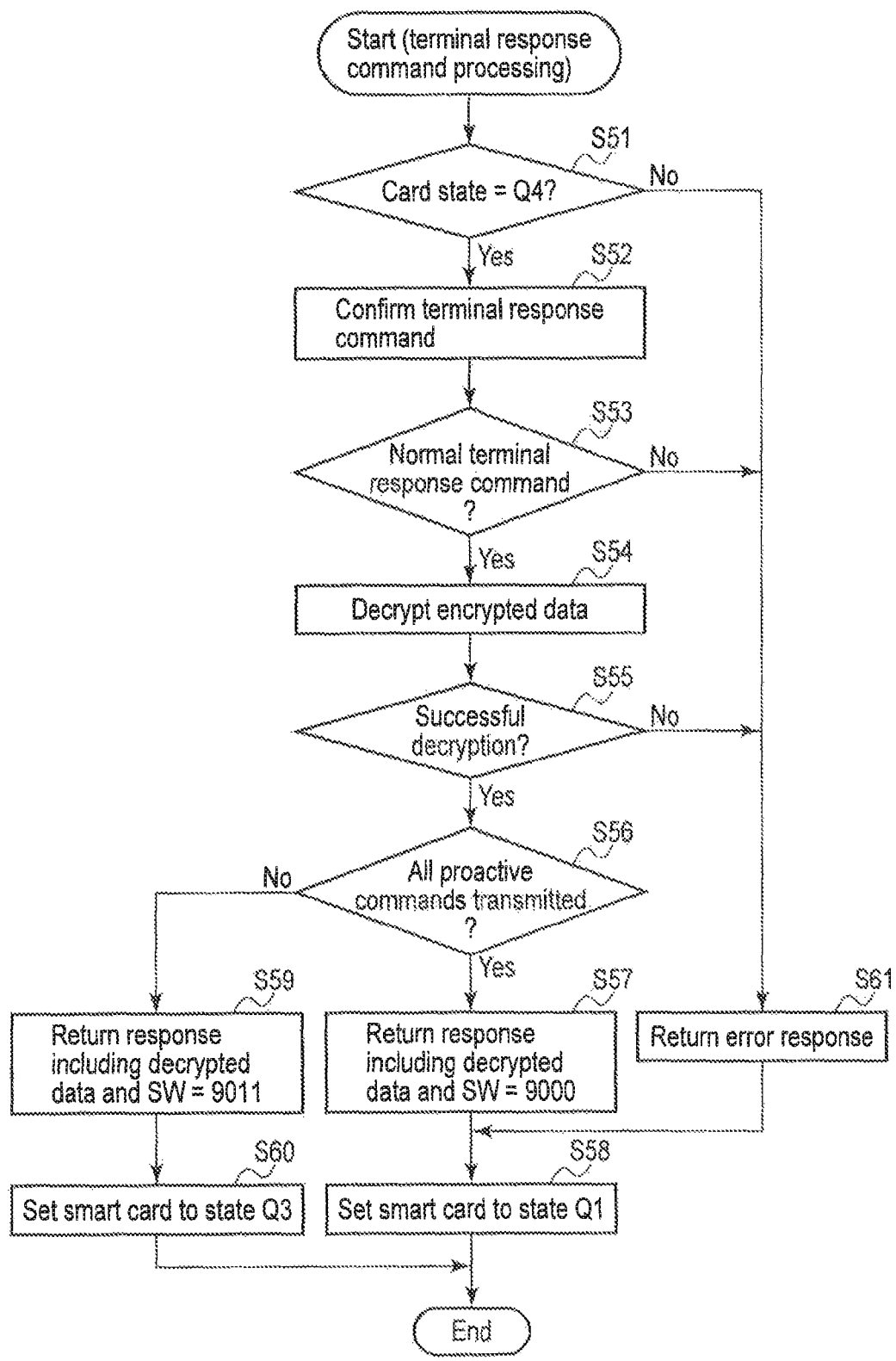
F I G. 10

… (1)

SMART CARD AND PORTABLE ELECTRONIC APPARATUS

CROSS-REFERENCE TO RELATED APPLICATIONS

This application is based upon and claims the benefit of priority from Japanese Patent Application No. 2012-184531, filed Aug. 23, 2012, the entire contents of which are incorporated herein by reference.

FIELD

Embodiments described herein relate generally to a smart card and portable electronic apparatus.

BACKGROUND

A smart card accesses data stored in its internal memory to execute processing according to a command supplied from an external apparatus. A conventional smart card stores data required for command processing in its internal memory. However, since it is difficult for the smart card to mount a large-capacity memory due to physical limitations and the like, a data amount which can be internally stored is limited.

BRIEF DESCRIPTION OF THE DRAWINGS

FIG. 10 is a flowchart for explaining an operation example of terminal response command processing in the smart card according to the embodiment.

DETAILED DESCRIPTION

In general, according to one embodiment, a smart card (IC card) includes a communication unit, recording unit, first reception processor, determination unit, and first transmission processor. The communication unit exchanges data with an external terminal. The recording unit records data defined by definition information. The first reception processor receives a command from the external terminal via the communication unit. If the first reception processor receives the command, the determination unit determines whether or not data required for execution of the command is stored in the recording unit. If the determination unit determines that the required data is not stored in the recording unit, the first transmission processor transmits a response indicating the start of a session required to acquire data related to that data from the external terminal to the external terminal via the communication unit.

This embodiment will be described hereinafter with reference to the drawings.

Figures 1, 2:
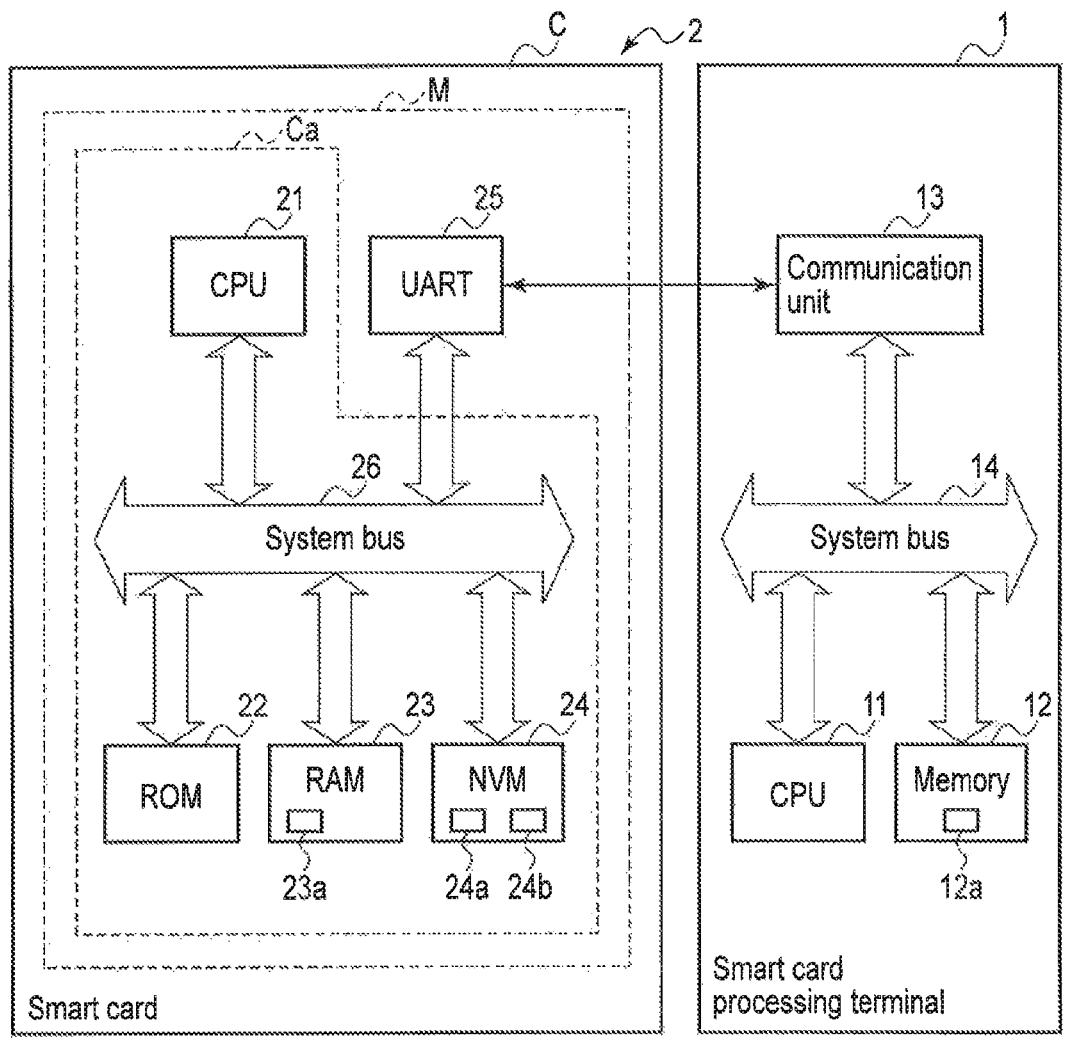
FIG. 1 is a block diagram showing an example of a smart card processing system including a smart card according to an embodiment and a smart card processing terminal.
FIG. 2 shows an example of a file table stored in an NVM of the smart card according to the embodiment.

FIG. 1 is a block diagram showing an example of the arrangement of a smart card (IC card) processing system which includes a smart card 2 as a portable electronic apparatus according to this embodiment, and a smart card processing terminal 1 as an external apparatus that communicates with the smart card 2.

The arrangement of the smart card processing terminal 1 will be described first.

In the arrangement example shown in FIG. 1, the smart card processing terminal 1 includes a CPU 11, memory 12, communication unit 13, and the like. These units are electrically connected to each other via a system bus 14.

The CPU 11 functions as a control unit which controls the operation of the overall smart card processing terminal 1. The CPU 11 executes various kinds of processing based on control programs and control data stored in the memory 12. The CPU 11 implements basic operation control of the smart card processing terminal 1 and various kinds of processing according to operation modes of the smart card processing terminal 1 by executing programs.

The CPU 11 has a function of transmitting a command to the smart card 2 via the communication unit 13, a function of executing various kinds of processing based on data received from the smart card 2, and the like. For example, the CPU 11 transmits a data write command to the smart card 2 via the communication unit 13, thereby executing control for writing data in a nonvolatile memory in the smart card 2. Also, the CPU 11 transmits a read command to the smart card 2, thereby executing control for reading data from the smart card 2.

The memory 12 is used to store control programs, control data, and the like used in the smart card processing terminal 1. The memory 12 includes a nonvolatile memory, volatile memory, and the like. The memory 12 may include, for example, a RAM, ROM, EEPROM, flash memory, or the like.

The memory 12 has a storage area 12a for storing data related to files managed by the smart card 2 (related data). For example, the smart card processing terminal 1 gives a file ID (terminal-side file ID) to the related data to be stored in the storage area 12a, and saves it as a file to be managed. The related data to be stored in the storage area 12a may be that related to files to be accessed by processing of the smart card 2 in response to a command from the smart card processing terminal 1. As data to be stored in the storage area 12a, personal information of the user of the smart card 2 and the like are assumed. However, data to be stored in the storage area 12a is not limited to specific contents.

In the description of this embodiment, assume that the related data to be stored in the storage area 12a is stored in advance in the memory 12. A sequence and timing required to write the related data in the storage area 12a are not limited to a specific arrangement.

Note that data related to files managed by the smart card 2 (related data) need only be saved in a state in which they can be accessed by the smart card processing terminal, and may be stored in an area other than the storage area 12a in the memory 12. For example, the related data may be saved in a third apparatus connected to the smart card processing terminal. In this case, upon reception of a related data read command from the smart card, the smart card processing terminal reads the related data from the third apparatus and transmits the read data to the smart card.

Also, the related data to be stored in the storage area 12a is encrypted data to be decrypted by the smart card 2. The encrypted data stored in the storage area 12a as the related data is decrypted using a key (key information) held by the smart card 2 or the like, and cannot be decrypted by the smart card processing terminal 1. That is, the smart card processing terminal 1 does not hold any information (key) required to decrypt the encrypted data stored in the storage area 12a of the memory 12. Thus, as this smart card system, even when the smart card processing terminal 1 is illicitly accessed, the encrypted data stored in the storage area 12a can be prevented from being decrypted.

The communication unit 13 is an interface device required to communicate with the smart card 2. The communication unit 13 includes a contact portion required to be physically and electrically connected to that of the smart card 2 and the like. Note that when the smart card 2 is a contactless smart card, the communication unit 13 includes an interface device which communicates with the smart card 2 in a contactless manner.

The arrangement of the smart card 2 will be described below.

The smart card 2 is activated (set in an operable state) by receiving electric power, operation clocks, and the like supplied from an external apparatus such as the smart card processing terminal 1. In the description of this embodiment, assume that the smart card 2 is a contact smart card which is connected to the smart card processing terminal 1 via a contact interface. When the smart card 2 is a contact smart card, it is activated by receiving operation electric power and operation clocks supplied from the smart card processing terminal 1 via a contact portion as a communication interface.

An example of the arrangement of the smart card 2 will be described below.

The smart card 2 has a card-shaped main body C formed of plastic or the like. The smart card 2 incorporates a module M in the main body C. The module M is integrally formed while one or a plurality of IC chips Ca are connected to a communication external interface (UART), and is embedded in the main body C of the smart card 2.

As shown in FIG. 1, the smart card 2 includes a CPU 21, ROM 22, RAM 23, NVM 24, UART 25, and the like. These units are electrically connected to each other via a system bus 26. One or a plurality of IC chips Ca include the CPU 21, ROM 22, RAM 23, and NVM 24. The IC chips Ca configure the module M while being connected to the UART 25.

The CPU 21 functions as a control unit which controls the overall smart card 2. The CPU 21 executes various kinds of processing based on control programs and control data stored in the ROM 22 or NVM 24. The CPU 21 implements basic operation control of the smart card 2 and various kinds of processing according to operation modes of the smart card 2 by executing programs. Note that some of various functions such as the operation control and processing of the smart card 2 may be implemented by a hardware circuit.

The ROM 22 is a nonvolatile memory which stores control programs, control data, and the like in advance. The ROM 22 is incorporated in the smart card 2 while storing control programs, control data, and the like in the manufacturing stage. That is, the control programs and control data stored in the ROM 22 are incorporated according to the specification of the smart card 2 in advance.

The RAM 23 is a volatile memory. The RAM 23 temporarily stores data which is being processed by the CPU 21 and the like. For example, the RAM 23 includes a reception buffer, calculation buffer, transmission buffer, and the like. The reception buffer holds a command transmitted from the smart card processing terminal 1 via the UART 25. The calculation buffer holds intermediate results required for the CPU 21 to make various calculations. The transmission buffer holds data to be transmitted to the smart card processing terminal 1 via the UART 25. For example, the CPU 21 interprets a command held in the reception buffer, executes processing according to the command using the calculation buffer, and stores the result of the executed processing in the transmission buffer. Also, the RAM 23 includes a state table 23a which stores information indicating the state of a proactive session (to be described later) in the smart card 2.

The NVM 24 is a nonvolatile memory which allows to write and rewrite data. The NVM 24 includes, for example, an EEPROM, flash memory, or the like. The NVM 24 stores control programs, applications, and various data according to an operation purpose of the smart card 2. The NVM 24 stores data in various files managed in a predetermined management format. For example, the NVM 24 stores respective files such as a master file (MF), dedicated file (DF), and elementary file (EF), which are managed in a hierarchical structure. Also, the NVM 24 includes a file table 24a which stores definition information of respective files. Furthermore, the NVM 24 also includes a storage area 24b which stores key information (key) required to decrypt encrypted data saved in the smart card processing terminal 1 as the external apparatus.

The UART 25 is an interface required to communicate with the communication unit 13 of the smart card processing terminal 1. For example, when the smart card 2 is a contact smart card, the UART 25 includes a communication controller and contact portion, which are required to be physically and electrically connected to the communication unit 13 of the smart card processing terminal 1 so as to exchange signals.

Note that the smart card 2 may be connected to the smart card processing terminal 1 via a contactless communication method. When the smart card 2 is a contactless smart card, the UART 25 includes a communication controller, antenna, and the like, which are required to exchange data with the communication unit 13 of the smart card processing terminal 1 in a contactless manner.

Files stored in the NVM 24 of the smart card 2 will be described below.

Each file stored in the NVM 24 includes definition information of the file and data (real data) of a data area defined by the definition information. The NVM 24 includes a system area and user area. The file definition information is stored in the system area of the NVM 24, and the data area of the file is stored in the user area of the NVM 24. That is, each file includes the definition information in the system area and data of the data area in the user area defined by the definition information in the NVM 24.

The definition information of a file stored in the system area of the NVM 24 includes, for example, a file ID as identification information required to specify a file, address information indicating a start address of a data area of that file, size information indicating the size of the data area, and the like. Also, the data area allocated in the user area of the NVM 24 is an area which is defined by the definition information, and stores real data of that file. The system area of the NVM 24 has the file table 24a which collectively manages a plurality of pieces of definition information of a plurality of files.

For example, when a file designated by a file ID is to be read, the CPU 21 searches the file table 24a in the system area based on the designated file ID, loads definition information of that file, specifies a data area (for example, a start address and data size) of that file in the user area based on the loaded definition information, and reads real data of the file from the specified data area.

FIG. 2 shows an example of the configuration of the file table 24a stored in the system area of the NVM 24 of the smart card 2 according to this embodiment.

The file table 24a stores a file ID, address information, size information, and terminal-side file ID as definition information of a file.

The file ID is unique identification information required to specify a given file. The address information and size information are those required to specify a data area of that file. The address information indicates a start address of the data area of that file in the user area. The size information indicates a size of the data area of that file in the user area. The terminal-side file ID is information set when the smart card processing terminal 1 saves real data of that file. The terminal-side file ID is unique identification information required to specify a file which stores real data of that file saved in the smart card processing terminal 1.

The file table 24a stores a value which cannot be used as an address of a file as address information of a file whose data area is not allocated in the user area in the NVM 24 (a file whose real data is not stored in the data area). The value which cannot be used as an address is a value larger than a final address value of the NVM 24. In the example shown in FIG. 2, as the value which cannot be used as an address, 0xFFFF is stored. That is, in the example of the file table 24a shown in FIG. 2, the address information of a file whose data area is not allocated in the user area in the NVM 24 is 0xFFFF under the assumption that the final address of the NVM 24 is smaller than 0xFFFF.

In the example of the file table 24a shown in FIG. 2, as for a file whose data area is not allocated in the user area in the NVM 24, information used to specify a file saved in the smart card processing terminal 1, which stores related data (encrypted data) related to real data of that file is stored as a terminal-side file ID. Note that the terminal-side file ID need only be information which can specify a file managed by the smart card processing terminal 1. For example, a file ID of a file in the smart card 2 and that (terminal-side file ID) of a file which corresponds to that file and is saved in the smart card processing terminal 1 may be the same file ID.

In the file table 24a shown in FIG. 2, the smart card processing terminal 1 stores encrypted data which can be decrypted by the smart card 2 in a file indicated by the terminal-side file ID as related data which is related to real data whose address information is set to be 0xFFFF. In other words, the terminal-side file ID in the file table 24a is a file ID of a file saved by the smart card processing terminal 1 which stores real data of a file indicated by the file ID in an encrypted state.

Also, in the example of the file table 24a shown in FIG. 2, for a file with a file ID=0x0001 (that is, EF #1), address information=0x0123 and size information=0x0045 are defined as definition information. The file table 24a indicates that a data of the file of this definition information (that with file ID=0x0001) starts from address 0x0123 of the user area, and the size of the data is 0x0045.

On the other hand, for a file with file ID=0x0002 (that is, EF #2), address information=0xFFFF and size information=0x0065 are defined as definition information. Since the address information is 0xFFFF (an address other than the user area in the NVM 24), the data area of the file with file ID=0x0002 is not allocated in the user area in the NVM 24. Also, the file with file ID=0x0002 is set with a terminal-side file ID=0x0102. Therefore, in the example shown in FIG. 2, it can be judged that encrypted data obtained by encrypting real data of the file with file ID=0x0002 (that is, EF #2) is saved in the smart card processing terminal 1 as a file (that is, EF #102) with a file ID (terminal-side file ID)=0x0102.

Furthermore, the NVM 24 includes the storage area 24b which stores a key required to decrypt encrypted data saved in the smart card processing terminal 1. The key stored in the storage area 24b is that required to decrypt encrypted data saved in the storage area 12a by the smart card processing terminal 1 (in the example shown in FIG. 2, data stored in the file with file ID=0x0102). The key stored in the storage area 24b is that corresponding to an encryption method used to encrypt real data of a file defined in the smart card 2. The key required to decrypt the encrypted data saved in the smart card processing terminal 1 is not saved in the smart card processing terminal 1. The key required to decrypt encrypted data saved in the smart card processing terminal 1 need only decrypt that encrypted data in the smart card 2, and is not limited to a specific configuration.

State management of a proactive session in the smart card 2 will be described below.

The smart card processing system according to this embodiment has a function of a proactive session as that in which the smart card 2 issues a processing request to the smart card processing terminal 1, and the smart card processing terminal 1 executes processing according to the request from the smart card 2. The proactive session is, for example, a series of processes from when the smart card 2 transmits a command (proactive command) to the smart card processing terminal 1 until the smart card 2 receives a response from the smart card processing terminal 1. The proactive command will be described in detail later.

The smart card 2 stores information indicating whether or not the proactive session is in progress, and a stage in the proactive session in the state table 23a in the RAM 23. The smart card 2 stores the information indicating the state of the proactive session in the state table 23a in the RAM 23, thereby recognizing (managing) the current stage of the proactive session, and executing processing according to the stage of the proactive session.

Figures 3, 4:
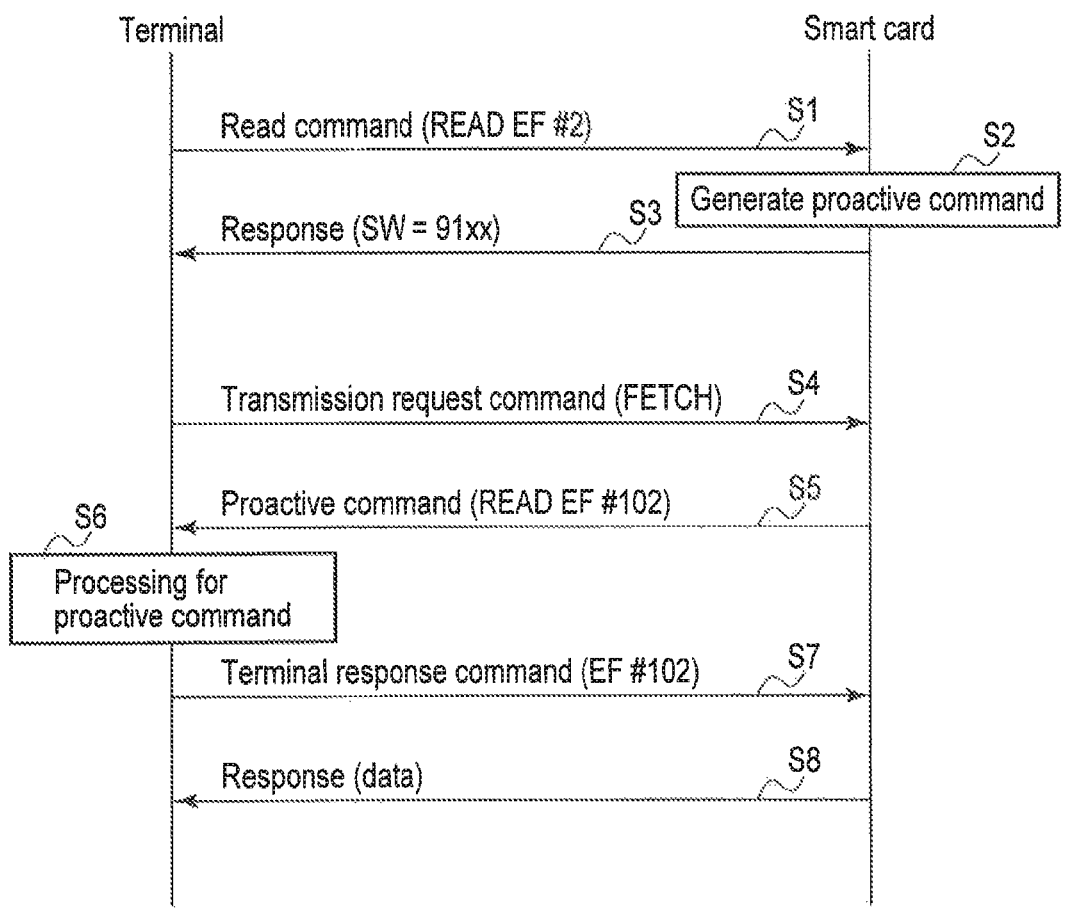
FIG. 3 is a table showing an example of states of the smart card according to the embodiment.
FIG. 4 is a schematic chart for explaining the sequence of a proactive session in the smart card according to the embodiment.

FIG. 3 shows a setting example of information indicating the state of the proactive session in the smart card 2.

State Q1 is a state in which no proactive command is generated. That is, state Q1 indicates that the proactive session is not started. In state Q1, the smart card 2 stores 0x12 in the state table 23a allocated on the RAM 23 as a value indicating the state of the proactive session. Also, assume that the smart card 2 is set to state Q1 in an initial state immediately after activation.

State Q2 is a state in which the smart card 2 generates a proactive command, and does not transmit an extraction request of the generated proactive command to the external apparatus (that is, the smart card processing terminal 1) yet. That is, in state Q2, although the proactive session is started, and the smart card generates a proactive command, an extraction request is not transmitted to the external apparatus yet. Also, in state Q2, the smart card 2 stores 0x24 in the state table 23*a* allocated on the RAM 23 as a value indicating the state of the proactive session.

State Q3 is a state in which a proactive command has been generated, and an extraction request of the generated proactive command has been transmitted to the external apparatus (IC card processing terminal 1). That is, in state Q3, after the proactive session is started, the smart card 2 has generated a proactive command, and has already transmitted the extraction request of the generated proactive command to the external apparatus. Also, in state Q3, the smart card 2 stores 0x48 in the state table 23*a* allocated on the RAM 23 as a value indicating the state of the proactive session.

State Q4 is a state in which the proactive command has been transmitted in response to the extraction request from the external apparatus, and a response as a processing result to the proactive command from the external apparatus is awaited. That is, in state Q4, after the proactive command generated in the proactive session is transmitted to the external apparatus, a response to the transmitted proactive command is awaited. Also, in state Q4, the smart card 2 stores 0x81 in the state table 23*a* allocated on the RAM 23 as a value indicating the state of the proactive session.

The sequence of the proactive session in the smart card processing system will be described below.

FIG. 4 is a schematic chart for explaining the sequence of the processing of the proactive session in the smart card processing system according to this embodiment. The processing example shown in FIG. 4 assumes the sequence of read processing for the file with file ID=0x0002 (EF #2) in the file table 24*a* shown in FIG. 2. For this reason, the following description will be given under the assumption of the read processing for the file with file ID=0x0002 (EF #2) in the file table 24*a* shown in FIG. 2.

The CPU 11 of the smart card processing terminal 1 generates a read command (READ EF #2) which requests the smart card 2 to read the file with file ID=0x0002 (that is, EF #2). After the read command is generated, the CPU 11 transmits the generated read command to the smart card 2 via the communication unit 13 (step S1).

When the UART 25 receives the read command from the smart card processing terminal 1, the CPU 21 of the smart card 2 extracts a file ID of a read target file designated by the read command. In the processing example shown in FIG. 4, the file ID of the file designated as the read target by the read command is 0x0002.

After the file ID of the read target file is extracted from the read command, the CPU 21 acquires definition information corresponding to the extracted file ID from the file table 24*a*. In the example of the file table 24*a* shown in FIG. 2, definition information corresponding to file ID=0x0002 includes address information=0xFFFF, size information=0x0067, and a terminal-side file ID=0x0102. When the address information is 0xFFFF, the CPU 21 determines that a data area of the read target file is not allocated in the user area of the NVM 24 (that is, real data of file EF #2 is not stored in the smart card 2).

When the CPU 21 determines that the data area of the read target file is not allocated in the user area of the NVM 24, it starts a proactive session so as to acquire file EF #2 from the smart card processing terminal 1. The CPU 21 executes processing for acquiring encrypted data from file EF #102 in the smart card processing terminal 1 corresponding to file EF #2 in the smart card 2 by the proactive session.

That is, when the CPU 21 determines that the data area of the read target file is not allocated in the user area of the NVM 24, it generates a proactive command (step S2). The proactive command is a processing request command from the smart card 2 to the smart card processing terminal 1. For example, when the smart card 2 transmits the proactive command to the smart card processing terminal 1, it can acquire a required file from the smart card processing terminal 1. However, since the smart card 2 operates by receiving a command from the smart card processing terminal 1 as a host apparatus, it cannot unilaterally transmit the proactive command at an arbitrary timing. For this reason, the smart card 2 issues an extraction request of the proactive command as a response to the read command, and transmits the proactive command in response to a transmission request command of the proactive command from the smart card processing terminal 1.

In the processing example shown in FIG. 4, since the terminal-side file ID corresponding to file ID EF #2 of the read target file is 0x0102, the CPU 21 generates a proactive command (READ EF #102) which requests the smart card processing terminal 1 to acquire (read) EF #102 (that is, encrypted data obtained by encrypting real data of file ID EF #2).

Figure 5:
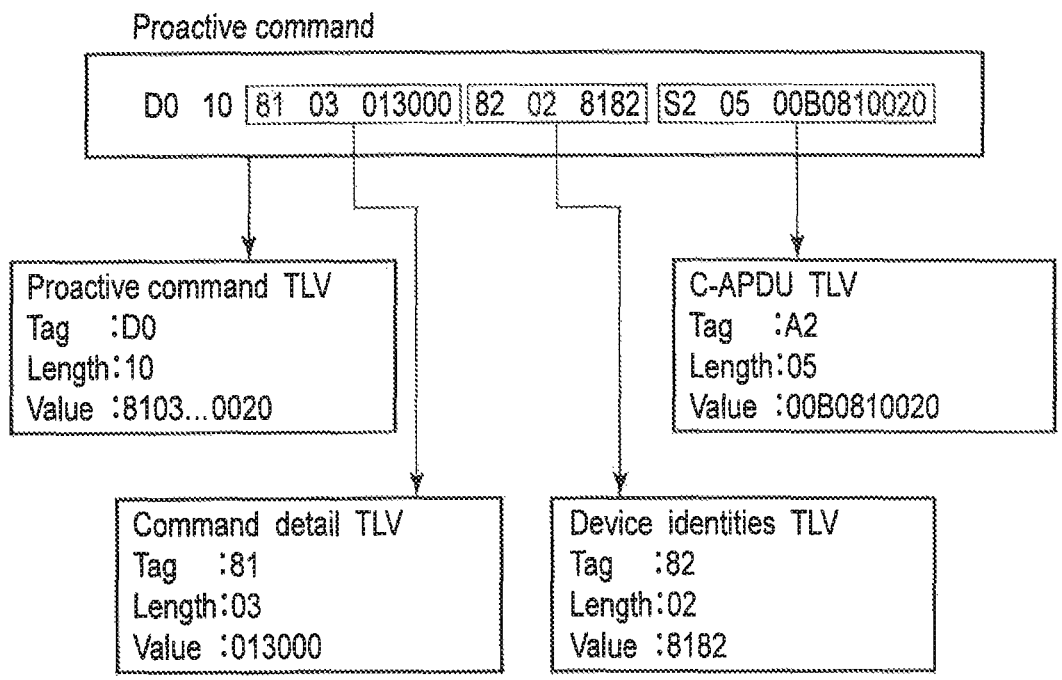
FIG. 5 shows an example of a proactive command according to the embodiment.

FIG. 5 shows an example of the proactive command generated by the smart card 2 according to this embodiment.

As shown in FIG. 5, the proactive command is data of the TLV format (TLV data) including an identifier (Tag), data length (Length), and value (Value). In the example shown in FIG. 5, the proactive command has a nested structure (a structure in which one or a plurality of TLV data are included in a value (Value) of parent TLV data). The value (Value) of the proactive command stores values Command detail TLV, Device identities TLV, and C-APDU TLV.

The value Command detail TLV indicates that a proactive command type is PERFORM CARD APDU. The value Device identities TLV indicates that the proactive command is transmitted from the smart card 2 toward the smart card processing terminal 1. The value C-APDU TLV stores information indicating a file to be acquired from the smart card processing terminal 1.

Note that the configuration of the proactive command is not limited to the specific configuration. Also, a plurality of proactive commands may be generated. For example, when a plurality of files are designated by a read command, and they are not stored in the smart card 2, the CPU 21 may generate a plurality of proactive commands required to read these files. Furthermore, a plurality of read commands may be stored in one proactive command. This can be implemented so that the configuration example shown in FIG. 5 includes a plurality of values C-APDU TLV, which store read targets.

Even when one file designated by a command is not stored in the smart card 2, related data (encrypted data) related to real data of that file may be divided into a plurality of files, which are saved in the smart card processing terminal 1. In such case, the file table 24*a* can store a plurality of terminal-side file IDs for one file. In this case, the CPU 21 may generate a plurality of proactive commands so as to respectively read a plurality of files in the smart card processing terminal 1.

After the CPU 21 generates the aforementioned proactive command, it stores the generated proactive command in the RAM 23. Note that the CPU 21 may store the generated proactive command in the NVM 24.

After the CPU 21 stores the generated proactive command in the RAM 23, it sets information (0x24) indicating that the smart card 2 is in state Q2 in the state table 23*a*, and transmits response data (for example, a status word (SW)= 91xx (xx indicates the number of bytes of the proactive command)) indicating that a proactive session is to be started (alternatively, the proactive command is stored) to the smart card processing terminal 1 (step S3). After the CPU 21 transmits the response data indicating that the proactive session is to be started to the smart card processing terminal 1, it sets information (0x48) indicating that the smart card 2 is in state Q3 in the state table 23*a* in the RAM 23.

Note that the response data indicating that the proactive session is to be started also serves as an extraction request of the proactive command (a transmission request of a FETCH command) to the smart card processing terminal 1. That is, when the CPU 21 transmits the response data indicating that the proactive session is to be started, it equivalently transmits an extraction request of the proactive command to the smart card processing terminal 1.

The smart card processing terminal 1 receives the response data indicating that the proactive session is to be started from the smart card 2 via the communication unit 13. Upon reception of the response data indicating that the proactive session is to be started, the CPU 11 judges whether or not the proactive command is ready to be received (executed) from the smart card 2. When the proactive command is ready to be received (executed), the CPU 11 transmits a transmission request command (FETCH command) which requests the smart card 2 to transmit the proactive command via the communication unit 13 (step S4).

The smart card 2 receives the command transmission request command (FETCH command) via the UART 25. Upon reception of the FETCH command, the CPU 21 transmits the proactive command stored in the RAM 23 to the smart card processing terminal 1 via the UART 25 (step S5). After the CPU 21 transmits the proactive command stored in the RAM 23 to the smart card processing terminal 1, it sets information (0x81) indicating that the smart card 2 is in state Q4 in the state table 23*a* in the RAM 23.

Upon reception of the proactive command from the smart card 2 via the communication unit 13, the CPU 11 of the smart card processing terminal 1 executes processing according to the proactive command (step S6). In this case, the smart card processing terminal 1 receives, from the smart card 2, the proactive command that requests to read data of the file with the file ID (EF #102) saved in the smart card processing terminal 1.

When such proactive command is received, the CPU 11 extracts the file ID from the received proactive command, and reads data of the file with the extracted file ID (EF #102) from the memory 12. In this case, the data of file ID EF #102 is encrypted data obtained by encrypting real data of file ID EF #2 in the smart card 2. After the CPU 11 reads the encrypted data stored in the file (EF #102) from the memory 12, it generates a terminal response command including that encrypted data, and transmits the generated terminal response command to the smart card 2 via the communication unit 13.

The terminal response command is data in the TLV format (TLV data) including an identifier (Tag), data length (Length), and value (Value). Also, the terminal response command has a nested structure (a structure in which one or a plurality of TLV data are included in a value (Value) of parent TLV data).

Figure 6:
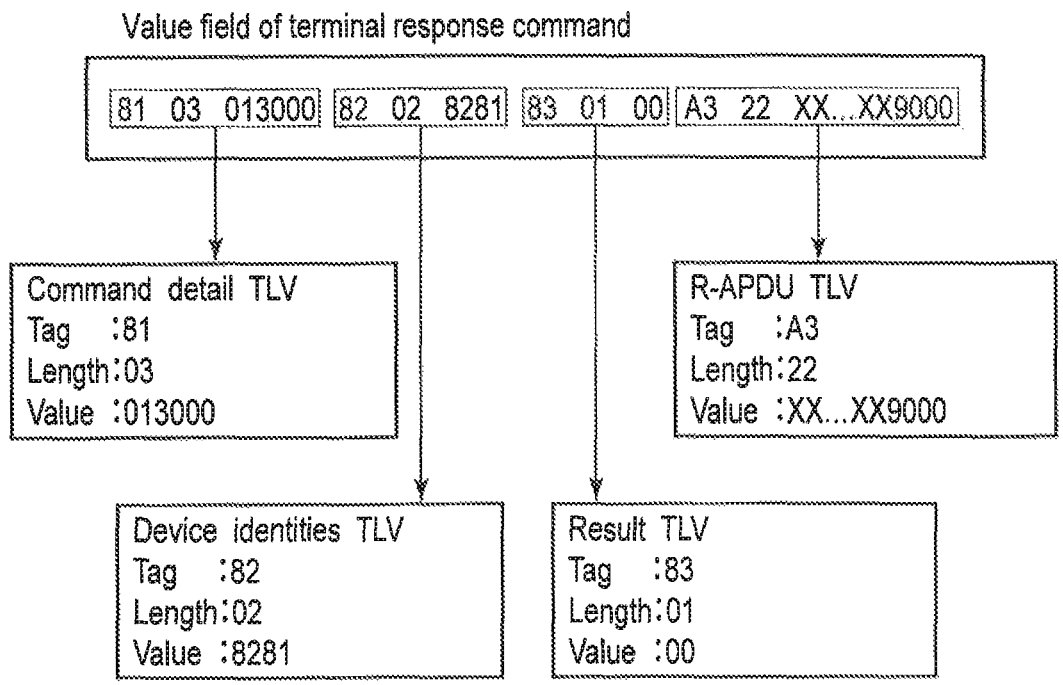
FIG. 6 shows an example of a Value field of a terminal response command to the proactive command according to the embodiment.

FIG. 6 shows an example of a Value field of the terminal response command.

The Value field of the terminal response command includes Command detail TLV, Device identities TLV, Result TLV, and R-APDU TLV.

The value Command detail TLV indicates that a proactive command type is PERFORM CARD APDU. The value Device identities TLV indicates that the response is transmitted from the smart card processing terminal 1 toward the smart card 2. The value Result TLV indicates that execution of the proactive command is normally terminated. The value R-APDU TLV stores EF #102 (that is, encrypted data). 9000 at the end of the value R-APDU TLV is an SW indicating that the command is normally processed.

Upon reception of the terminal response command, the CPU 21 of the smart card 2 extracts data of EF #102 (that is, encrypted data obtained by encrypting data of EF #2, which is requested to be read by the read command) from the terminal response data. After the CPU 21 extracts the data of EF #102 (that is, encrypted data) from the terminal response command, it decrypts the extracted encrypted data using the key stored in the storage area 24*b* in the NVM 24. The decryption method is not limited to a specific method.

After the CPU 21 decrypts the encrypted data included in the terminal response command, it generates response data including the decrypted data (that is, data of EF #2, which is requested to be read by the read command), and a status word (SW) (for example, SW=9000) indicating that the proactive session is closed. After the CPU 21 generates the response data, it transmits the generated response data to the smart card processing terminal 1 via the UART 25. After the CPU 21 transmits the generated response data to the smart card processing terminal 1, it sets information (0x12) indicating that the smart card 2 is in state Q1 in the state table 23*a* in the RAM 23.

Upon reception of the response data, the CPU 11 of the smart card processing terminal 1 extracts the decrypted data (that is, the real data of EF #2, which is requested to be read by the read command transmitted in step S1) from the response data. After the decrypted data (that is, the real data of EF #2 is extracted, the CPU 21 ends the read command processing.

Note that when a plurality of proactive commands are generated, the CPU 21 of the smart card 2 decrypts encrypted data received from the smart card processing terminal 1, and generates response data including the decrypted data and a status word (for example, SW=91XX) indicating the proactive session is in progress. The CPU 21 of the smart card 2 transmits the response data including the status word which indicates that the proactive session is in progress to the smart card processing terminal 1. Thus, the smart card processing terminal 1 can supply a transmission request command (FETCH command) to the smart card 2 again.

In this case, the CPU 21 transmits the response data including the status word which indicating that the proactive session is in progress, sets information (0x48) indicating that the smart card 2 is in state Q3 in the state table 23*a*, and waits for a transmission request command (FETCH command) again. The CPU 21 of the smart card 2 repeats the aforementioned operation until it transmits all proactive commands.

With the aforementioned processing, the smart card 2 can acquire encrypted data saved in the smart card processing terminal 1 as the external apparatus of the smart card 2 from the smart card processing terminal 1, can decrypt the acquired encrypted data, and can transmit the decrypted data to the smart card processing terminal 1. In this manner, by storing data in the external apparatus, the smart card 2 can save the data capacity of the internal memory. Even when the smart card 2 is lost, since the data main body is saved in the smart card processing terminal in an encrypted state, data can be prevented from leaking from the lost smart card 2.

Since encrypted data and a key are separately managed in the smart card processing terminal 1 and smart card 2, even when one of the smart card processing terminal 1 and smart card 2 is illicitly accessed, data cannot be read. Since the smart card 2 manages the file table which links original data with encrypted data obtained by encrypting that data, even when the smart card processing terminal 1 is illicitly accessed, it is difficult to detect the original data of the encrypted data stored in the smart card processing terminal 1, thus enhancing the security.

The operation of command processing in the smart card 2 will be described below.

Figure 7:
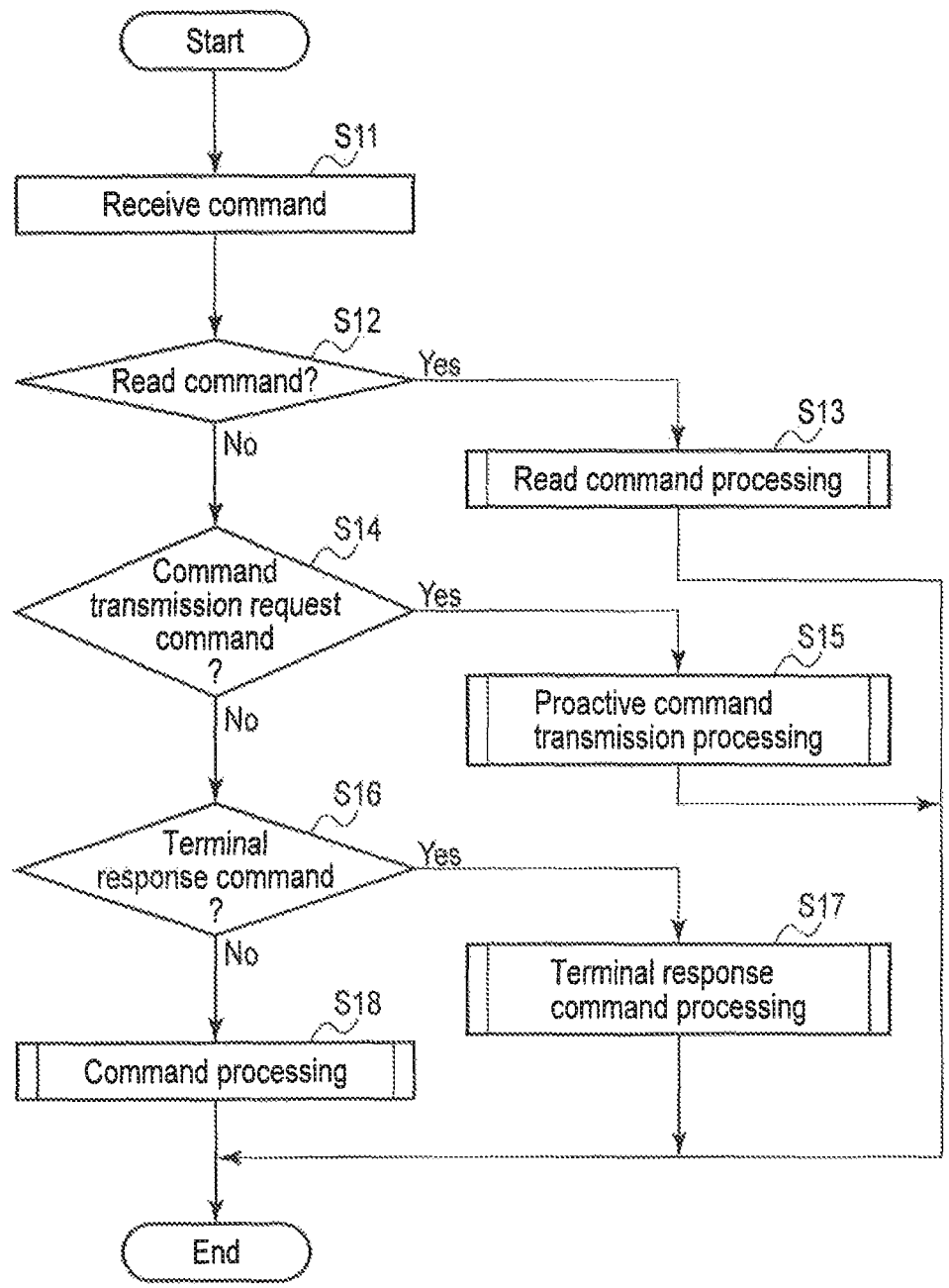
FIG. 7 is a flowchart for explaining an operation example of command processing in the smart card according to the embodiment.

FIG. 7 is a flowchart for explaining an operation example of command processing in the smart card 2.

The CPU 21 of the smart card 2 receives a command from the smart card processing terminal 1 via the UART 25 (step 11). Upon reception of the command via the UART 25, the CPU 21 analyzes the contents of the received command, and executes processing according to the command.

For example, if the CPU 21 determines that the received command is a read command (YES in step 12), it executes read command processing required to read data of a designated file (step 13). On the other hand, if the CPU 21 determines that the received command is a transmission request command (FETCH command) which requests to transmit a proactive command (YES in step 14), it executes processing required to transmit the proactive command (proactive command transmission processing) (step 15). If the CPU 21 determines that the received command is a terminal response command (YES in step 16), it executes terminal response command processing (step 17).

Note that the read command processing, proactive command transmission processing, and terminal response command processing will be described later.

If the CPU 21 determines that the received command is none of the read command, FETCH command, and terminal response command (NO in step 16), it executes processing according to the received command, and transmits response data to the command, which data includes the executed processing result, to the smart card processing terminal 1 (step 18).

The read command processing in the smart card 2 will be described below.

Figure 8:
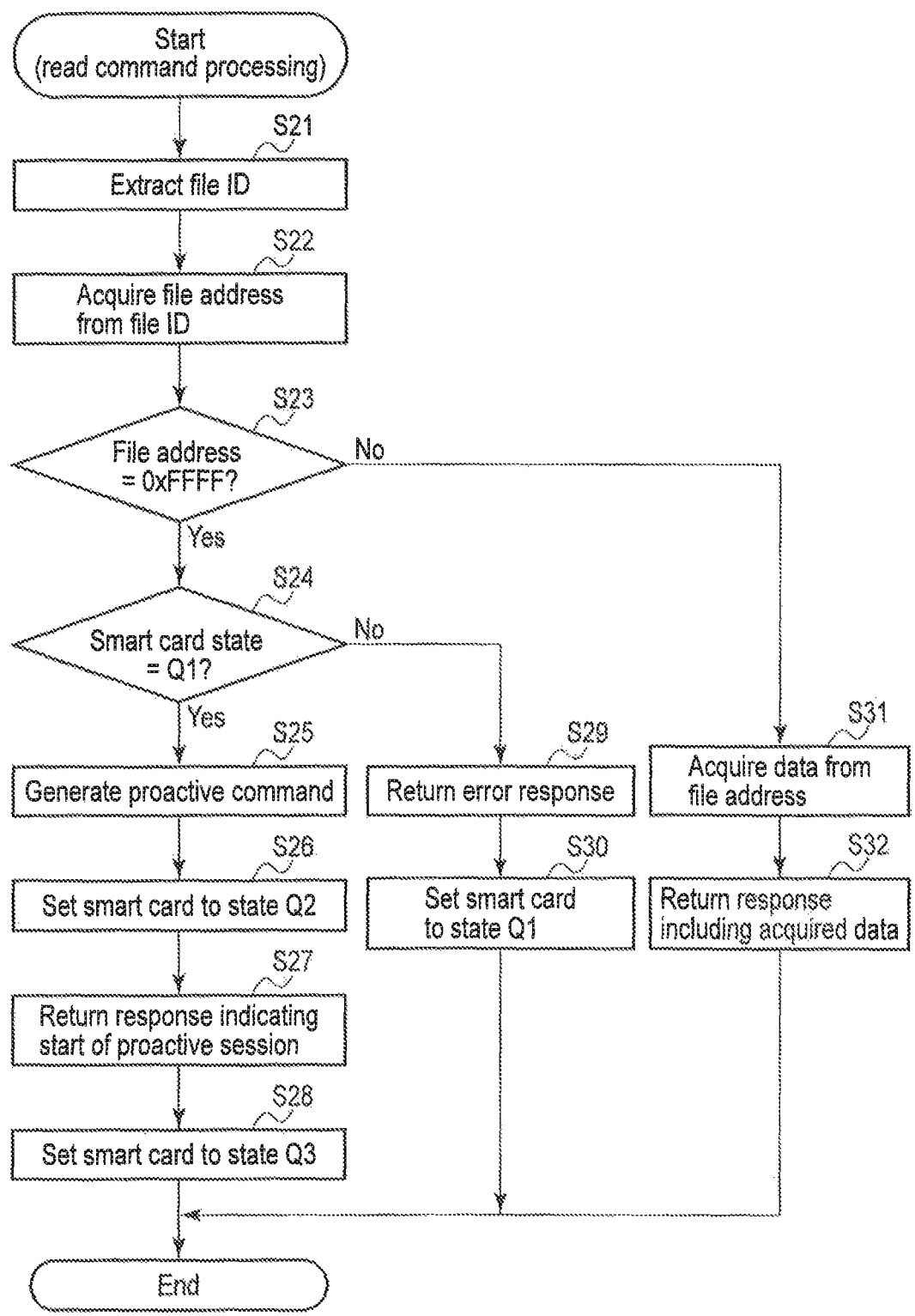
FIG. 8 is a flowchart for explaining an operation example of read command processing in the smart card according to the embodiment.

FIG. 8 is a flowchart for explaining an operation example of the read command processing in the smart card 2.

Upon reception of the read command, the CPU 21 of the smart card 2 extracts a file ID which is stored in the read command and designates a file as a read target (step 21). After the CPU 21 extracts the file ID of the read target file stored in the read command, it acquires address information corresponding to the file ID of the read target file from the file table 24*a* (step 22). After the CPU 21 acquires the address information corresponding to the file ID from the file table 24*a*, it determines whether or not a value of the acquired address information is 0xFFFF (step 23).

If the CPU 21 determines that the acquired address information is 0xFFFF (YES in step 23), it determines with reference to the state table 23*a* in the RAM 23 whether or not the smart card 2 is in state Q1 (step 24). For example, according to the setting example shown in FIG. 3, the CPU 21 determines whether or not a value indicating the smart card state in the state table 23*a* is 0x12.

If the CPU 21 determines that the smart card 2 is in state Q1 (YES in step 24), it acquires a terminal-side file ID corresponding to the read target file from the file table 24*a*.

After the CPU 21 acquires the terminal-side file ID corresponding to the read target file from the file table 24*a*, it generates a proactive command required to acquire a file of the terminal-side file ID from the smart card processing terminal 1 (step 25). After the CPU 21 generates the proactive command, it stores the generated proactive command in the RAM 23 (or the NVM 24).

After the CPU 21 stores the generated proactive command in the RAM 23, it sets the smart card 2 to state Q2 (step 26). For example, the CPU 21 rewrites the value of the state table 23*a* to 0x24.

After the CPU 21 sets the smart card 2 in state Q2, it generates response data (for example, that set with a status word=91xx) indicating that a proactive session is to be started, and transmits the generated response data to the smart card processing terminal 1 (step 27).

After the CPU 21 transmits the generated response data to the smart card processing terminal 1, it sets the smart card 2 to state Q3 (step 28). For example, the CPU 21 rewrites the value of the state table 23*a* to 0x48.

After the CPU 21 sets the smart card 2 to state Q3, it ends the read command processing, and is ready to accept a command from the smart card processing terminal 1.

If the CPU 21 determines that the smart card 2 is not in state Q1 (NO in step 24), it generates an error response indicating that the state of the smart card 2 is improper, and transmits the generated error response to the smart card processing terminal 1 (step 29). After the CPU 21 transmits the generated error response to the smart card processing terminal 1, it sets the smart card 2 to state Q1 (step 30). For example, the CPU 21 rewrites the value of the state table 23*a* to 0x12. After the CPU 21 sets the smart card 2 to state Q1, it ends the read command processing, and is ready to accept a command from the smart card processing terminal 1.

If the CPU 21 determines that the address information acquired from the file table 24*a* is not 0xFFFF (NO in step 23), it reads data written in a data area indicated by the acquired address information and size information (step 31). After the CPU 21 reads the data written in the data area indicated by the acquired address information, the CPU 21 generates response data including the read data, and transmits the generated response data to the smart card processing terminal 1 (step 32). After the CPU 21 transmits the generated response data to the smart card processing terminal 1, it ends the read command processing, and is ready to accept a command from the smart card processing terminal 1.

An example of the proactive command transmission processing corresponding to the transmission request command (FETCH command) of the proactive command in the smart card 2 will be described below.

Figure 9:
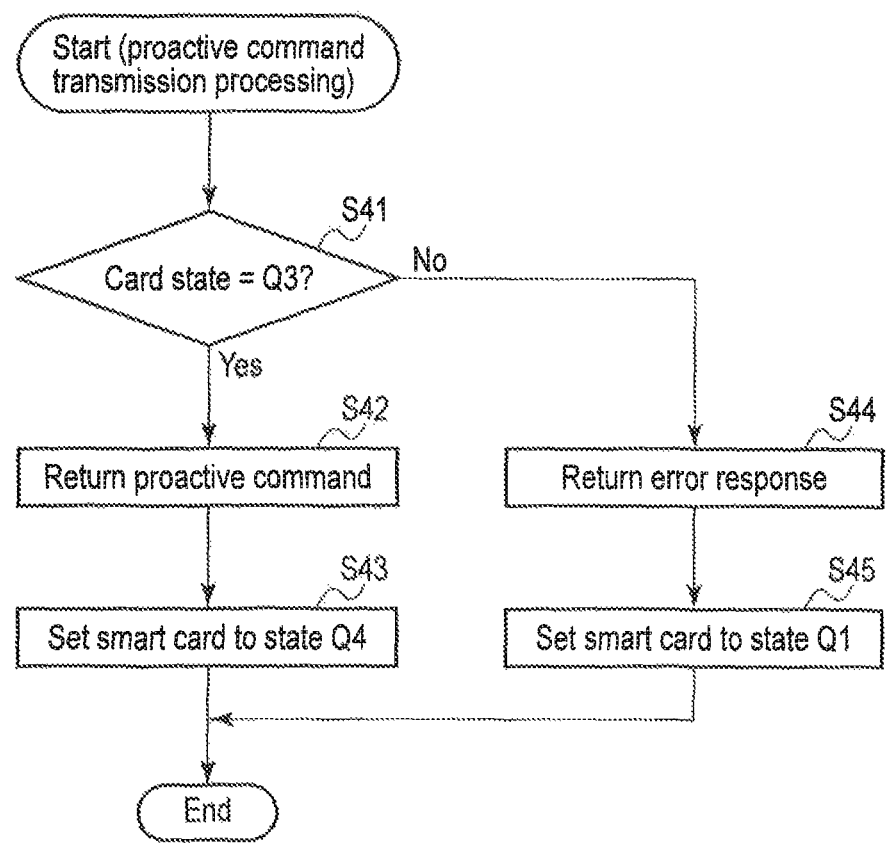
FIG. 9 is a flowchart for explaining an operation example of proactive command transmission processing in the smart card according to the embodiment.

FIG. 9 is a flowchart for explaining an operation example of the processing corresponding to the transmission request command (FETCH command) in the smart card 2.

Upon reception of the transmission request command (FETCH command) of the proactive command, the CPU 21 determines whether or not the smart card 2 is in state Q3 (step 41). For example, according to the setting example shown in FIG. 3, the CPU 21 determines whether or not the value indicating the state of the smart card 2 in the state table 23*a* is 0x48.

If the CPU 21 determines that the smart card 2 is in state Q3 (YES in step 41), it transmits the proactive command stored in the RAM 23 to the smart card processing terminal 1 (step 42). Note that when the proactive command is stored in the NVM 24, the CPU 21 reads the proactive command from the NVM 24, and transmits the read proactive command to the smart card processing terminal 1.

After the CPU 21 transmits the proactive command to the smart card processing terminal 1, it sets the smart card 2 to state Q4 (step 43). For example, the CPU 21 rewrites the value of the state table 23a to 0x81. After the CPU 21 sets the smart card 2 to state Q4, it ends the proactive command transmission processing, and is ready to accept a command from the smart card processing terminal 1.

If the CPU 21 determines that the smart card 2 is not in state Q3 (NO in step 41), it generates an error response indicating that the state of the smart card 2 is improper, and transmits the generated error response to the smart card processing terminal 1 (step 44). After the CPU 21 transmits the generated error response to the smart card processing terminal 1, it sets the smart card 2 to state Q1 (step 45). For example, the CPU 21 rewrites the value indicating the state of the smart card 2 in the state table 23a to 0x12. After the CPU 21 sets the smart card 2 to state Q1, it ends the proactive command transmission processing, and is ready to accept a command from the smart card processing terminal 1.

The processing corresponding to the terminal response command will be described below.

FIG. 10 is a flowchart for explaining an operation example of the processing corresponding to the terminal response command in the smart card 2.

Upon reception of the terminal response command, the CPU 21 determines whether or not the smart card 2 is in state Q4 (step 51). For example, according to the setting example shown in FIG. 3, the CPU 21 determines whether or not the value indicating the state of the smart card 2 in the state table 23a is 0x81.

If the CPU 21 determines that the smart card 2 is in state Q4 (YES in step 51), it confirms the terminal response command (step 52). For example, the CPU 21 confirms if the data field of the terminal response command includes Result TLV, if Result TLV indicates normal termination of the proactive command (for example, if the value of the Value field of Result TLV is 00), if the data field of the terminal response command includes R-APDU TLV, if R-APDU TLV indicates normal termination of the command (for example, R-APDU TLV ends at 9000), and so forth.

If the CPU 21 determines as the confirmation result of the terminal response command that the terminal response command is a normal response (YES in step 53), it extracts encrypted data (for example, that stored in R-APDU TLV) from the terminal response command. After the CPU 21 extracts the encrypted data from the terminal response command, it decrypts the extracted encrypted data using the key stored in the storage area 24b of the NVM 24 (step 54).

After the CPU 21 decrypts the extracted encrypted data using the key stored in the storage area 24b of the NVM 24, it determines whether or not decryption of the encrypted data has succeeded (step 55). For example, the CPU 21 determines a success/failure of decryption by checking if the decrypted data is an integer multiple of an encrypted block length, if padding removal has been normally done, and so forth.

If the CPU 21 determines that decryption of the encrypted data has succeeded (YES in step 55), it determines whether or not all proactive commands have been transmitted (step 56). For example, if the CPU 21 generates a plurality off proactive commands, it determines whether or not all of the plurality of generated proactive commands have been transmitted.

If the CPU 21 determines that all the proactive commands have been transmitted (YES in step 56), it generates response data including the decrypted data and a status word (for example, SW=9000) indicating that the proactive session is closed, and transmits the generated response data to the smart card processing terminal 1 (step 57).

After the CPU 21 transmits the generated response data to the smart card processing terminal 1, it sets the smart card 2 to state Q1 (step 58). For example, the CPU 21 rewrites the value indicating the state of the smart card 2 in the state table 23a to 0x12.

After the CPU 21 sets the smart card 2 to state Q1, it ends the processing corresponding to the terminal response command, and is ready to accept a command from the smart card processing terminal 1.

On the other hand, if the CPU 21 determines that all the proactive commands have not been transmitted yet (NO in step 56), it generates response data including decrypted data and a status word (for example, SW=91xx) indicating that the proactive session is in progress, and transmits the generated response data to the smart card processing terminal 1 (step 59).

After the CPU 21 transmits the generated response data to the smart card processing terminal 1, it sets the smart card 2 to state Q3 (step 60). For example, the CPU 21 rewrites the value indicating the state of the smart card 2 in the state table 23a to 0x48.

After the CPU 21 sets the smart card 2 to state Q3, it ends the processing corresponding to the terminal response command, and is ready to accept a command from the smart card processing terminal 1.

If the CPU 21 determines that the smart card 2 is not in state Q4 (NO in step 51), it generates an error response indicating that the smart card 2 is not in state Q4, and transmits the generated error response to the smart card processing terminal 1 (step 61). After the CPU 21 transmits the generated error response to the smart card processing terminal 1, it sets the smart card 2 to state Q1 (step 58). For example, the CPU 21 rewrites the value indicating the state of the smart card 2 in the state table 23a to 0x12. After the CPU 21 sets the smart card 2 to state Q1, it ends the processing corresponding to the terminal response command, and is ready to accept a command from the smart card processing terminal 1.

If the CPU 21 determines as the confirmation result of the terminal response command that the terminal response command is not a normal response (NO in step 53), it generates an error response indicating that the terminal response command is not a normal response, and transmits the generated error response to the smart card processing terminal 1 (step 61). After the CPU 21 transmits the generated error response to the smart card processing terminal 1, it sets the smart card 2 to state Q1 (step 58). For example, the CPU 21 rewrites the value indicating the state of the smart card 2 in the state table 23a to 0x12. After the CPU 21 sets the smart card 2 to state Q1, it ends the processing corresponding to the terminal response command, and is ready to accept a command from the smart card processing terminal 1.

On the other hand, if the CPU 21 determines that decryption of the encrypted data has failed (NO in step 55), it generates an error response indicating that decryption of the encrypted data has failed, and transmits the generated error response to the smart card processing terminal 1 (step 61). After the CPU 21 transmits the generated error response to the smart card processing terminal 1, it sets the smart card 2 to state Q1 (step 58). For example, the CPU 21 rewrites the value indicating the state of the smart card 2 in the state table 23a to 0x12. After the CPU 21 sets the smart card 2 to state Q1, it ends the processing corresponding to the terminal response command, and is ready to accept a command from the smart card processing terminal 1.

According to the aforementioned processing, the smart card processing terminal as the external apparatus stores data in an encrypted state, and the smart card can acquire the encrypted data from the smart card processing terminal by the proactive session as needed. Also, the smart card can decrypt the encrypted data acquired from the smart card processing terminal, and can transmit the decrypted data to the smart card processing terminal. With the aforementioned processing, a smart card and portable electronic apparatus, which are free from suppression of a data saving capacity of an internal memory, can be provided.

Note that in the respective operation examples of the smart card 2, after the CPU 21 transmits the error response, it sets the smart card 2 to state Q1. However, even after the CPU 21 transmits the error response, the state of the smart card 2 need not be changed. In this case, the CPU 21 may wait for transmission of a command, which has caused an error, from the smart card processing terminal 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A smart card comprising:
a circuit-based communication device that exchanges data with an external terminal;
a memory that records data defined by definition information; and
a central processing unit (CPU) that:
  receives a command from the external terminal via the communication device;
  determines whether target data of a processing target specified by the command is stored in the memory or in the external terminal, when the CPU receives the command;
  transmits a response indicating start of a session, which is required to acquire encrypted data obtained by encrypting the target data from the external terminal, to the external terminal via the communication device, when the CPU determines that the target data is stored in the external terminal;
  transmits a proactive command required to acquire the encrypted data from the external terminal after the CPU outputs the response indicating the start of the session to the external terminal;
  receives a terminal response command including the encrypted data from the external terminal as a response to the proactive command; and
  outputs an execution result of the command as a response to the terminal response command, wherein:
the CPU receives a transmission request command, which requests the CPU to transmit the proactive command, from the external terminal after the CPU outputs the response indicating the start of the session, and before the CPU outputs the proactive command; and
the CPU transmits the proactive command based on reception of the transmission request command.

2. The smart card according to claim 1, wherein:
the memory saves a key required to decrypt the encrypted data, and
the CPU decrypts the encrypted data that is included in the terminal response command received from the external terminal using the key stored in the memory.

3. The smart card according to claim 1, wherein
the command is a read command which requests that the target data recorded in the memory or in the external terminal be read.

4. The smart card according to claim 1, wherein:
the communication device, the memory, and the CPU make up a module formed from one or more integrated circuit chips, and
a plastic main body houses the module.

5. A smart card comprising:
a circuit-based communication device that exchanges data with an external terminal;
a memory that records data defined by definition information; and
a central processing unit (CPU) that:
  receives a command from the external terminal via the communication device;
  determines whether target data of a processing target specified by the command is stored in the memory or in the external terminal, when the CPU receives the command; and
  transmits a response indicating start of a session, which is required to acquire encrypted data obtained by encrypting the target data from the external terminal, to the external terminal via the communication device, when the CPU determines that the target data is stored in the external terminal, wherein:
the memory saves a key required to decrypt the encrypted data;
the CPU decrypts the encrypted data that is included in a terminal response command received from the external terminal using the key stored in the memory;
the CPU receives a transmission request command, which requests the CPU to transmit the proactive command, from the external terminal after the CPU outputs the response indicating the start of the session, and before the CPU outputs the proactive command; and
the CPU transmits the proactive command based on reception of the transmission request command.

6. The smart card according to claim 5, wherein the CPU further:
transmits a proactive command required to acquire the encrypted data from the external terminal after the CPU outputs the response indicating the start of the session to the external terminal;
receives the terminal response command including the encrypted data from the external terminal as a response to the proactive command; and
outputs an execution result of the command as a response to the terminal response command.

7. The smart card according to claim 5, wherein:
the CPU outputs the execution result after the CPU decrypts the encrypted data.

8. The smart card according to claim 5, wherein
the command is a read command which requests that the target data recorded in the memory or in the external terminal be read.

9. The smart card according to claim 5, wherein
the communication device, the memory, and the CPU make up a module formed from one or more integrated circuit chips, and
a plastic main body houses the module.

10. A smart card comprising:
a circuit-based communication device that exchanges data with an external terminal;
a memory that records data defined by definition information; and
a central processing unit (CPU) that:
  receives a command from the external terminal via the communication device;
  determines whether target data of a processing target specified by the command is stored in the memory or in the external terminal, when the CPU receives the command;
  transmits a response indicating start of a session, which is required to acquire encrypted data obtained by encrypting the target data from the external terminal, to the external terminal via the communication device, when the CPU determines that the target data is stored in the external terminal;
  transmits a proactive command required to acquire the encrypted data from the external terminal after the CPU outputs the response indicating the start of the session to the external terminal;
  receives a terminal response command including the encrypted data from the external terminal as a response to the proactive command; and
  outputs an execution result of the command as a response to the terminal response command,
  wherein:
the CPU receives a transmission request command, which requests the CPU to transmit the proactive command, from the external terminal after the CPU outputs the response indicating the start of the session, and before the CPU outputs the proactive command; and
the CPU transmits the proactive command based on reception of the transmission request command.

11. The smart card according to claim 10, wherein
the command is a read command which requests that the target data recorded in the memory or in the external terminal be read.

12. The smart card according to claim 10, wherein
the communication device, the memory, and the CPU make up a module formed from one or more integrated circuit chips, and
a plastic main body houses the module.

* * * * *